United States Patent [19]
Rzeszewski

[11] 4,434,438
[45] Feb. 28, 1984

[54] LOW COST AUTOMATIC EQUALIZER

[75] Inventor: Theodore S. Rzeszewski, Lombard, Ill.

[73] Assignee: Matsushita Electric Industrial Co., Ltd., Osaka, Japan

[21] Appl. No.: 282,039

[22] Filed: Jul. 10, 1981

[51] Int. Cl.³ .............................................. H04N 5/44
[52] U.S. Cl. ...................................... 358/167; 358/36; 358/35; 358/27; 328/155; 333/18; 333/28 R; 333/165; 333/166
[58] Field of Search .................... 358/162, 167, 35, 27, 358/28, 40, 325, 36, 21 R, 21 V, 160, 37, 38; 333/28 R, 18, 165, 166; 307/262; 328/155

[56] References Cited

U.S. PATENT DOCUMENTS

| | | | |
|---|---|---|---|
| 3,755,617 | 8/1973 | Ichida | 358/21 V |
| 4,020,500 | 4/1977 | Harwood | 358/19 |
| 4,044,381 | 8/1977 | Shimano et al. | 358/160 |
| 4,051,519 | 9/1977 | Harwood | 358/28 |
| 4,125,899 | 11/1978 | Kawai et al. | 333/28 R |
| 4,127,874 | 11/1978 | Isawa et al. | 358/167 |
| 4,128,848 | 12/1978 | Nakagawa | 358/167 |
| 4,237,476 | 12/1980 | Hanma et al. | 358/38 |
| 4,333,063 | 6/1982 | Ryu et al. | 333/28 R |

*Primary Examiner*—Michael A. Masinick

[57] ABSTRACT

A low cost automatic equalizer is provided for reducing the amplitude and phase distortion produced by close-in echos. The color subcarrier burst, or some other portion of the video signal having predetermined amplitude and phase characteristic prior to transmission, is gated into detection circuitry. A regenerated color subcarrier, phase shifted to be in phase with the subcarrier burst, is used to detect the in-phase and quadrature components of the subcarrier burst, which are indicative of amplitude and phase distortion. The signals indicative of amplitude and phase distortion are applied to a three tap delay line equalizer, where the amplitude and polarity of the first and third tapped signals are controlled in unison to reduce amplitude distortion, and where the amplitude of the first and third tapped signals is controlled in unison, but the polarity of the first and third tapped signals is controlled oppositely to reduce phase distortion.

10 Claims, 8 Drawing Figures

LOW COST AUTOMATIC EQUALIZER

DESCRIPTION OF THE INVENTION

The present invention relates to a technique for automatically compensating for waveform distortion in a transmitted television or teletext signal.

A transmitted television or teletext signal waveform may undergo distortion due to the characteristics of the propagtion path of the signal from the transmitter to the television or teletext receiver. One type of distortion, called "multipath" distortion, may be due to reflection of the signal by buildings and mountains, or impedance mismatches between the receiving antenna and cable or between the cables and the television or teletext receiver.

The multipath phenomenon may result in what is known as "close-in" echos. The close-in echos produce amplitude and phase distortions of the television or teletext signals which may result in a fuzzy or unclear picture due to overshoot, smearing and ringing in the video waveform, or loss of the teletext data. Multipath distortion may also produce "far-out" echos which produce a ghost-like appearance in the received video.

One approach to compensating for the distortion in the video waveform caused by close-in and far-out echos is to provide a transversal filter employed as a waveform equalizer. The transversal filter is usually comprised of a delay circuit usually having a large number of delay elements (on the order of 20) in series, each one delaying the video signals by T seconds. A plurality of amplitude and polarity adjusting circuits are provided for each delay element for independently adjusting the amplitude and polarity of the outputs from the individual delay elements. An adder circuit is provided for adding the outputs of the adjusting circuits. When the amplitude and polarity circuits are properly controlled, the output of the adder circuit will be substantially free from the close-in or far-out echo.

Several techniques for controlling the amplitude and polarity adjusting circuits have been proposed. For example, U.S. Pat. No. 4,044,381 to Shimano et al. relies upon the existance of a signal, such as the horizontal or vertical synchronization signal, which has a known constant waveform prior to transmission thereof. The signal having the constant waveform is compared with a reference signal having a waveform which is the same as that of the known constant waveform, prior to transmission, such that upon comparison of the two signals, the distortion of the waveform produced in transmission may be determined by detecting differences between the two. The detected distortion is utilized for controlling the amplitude and polarity adjusting circuits in the transversal filter.

Another technique, such as that taught by Iwasawa et al., U.S. Pat. No. 4,127,874, detects variations in a unit step-like signal included in the transmitted video signal, such as the vertical synchronization pulse. Ideally, the synchronization pulse has a constant amplitude, but when distortion has occurred, the amplitude of the synchronization pulse varies with time. This pulse is examined and sampled at a high rate, and each sample value is compared with a subsequent sampled value. When these samples have different levels, indicating that distortion has occurred, the output of the sampling section provides phase and amplitude information by which the adjustment circuitry may be controlled.

Both of these prior art techniques for controlling the amplitude and polarity adjustment circuits for each of the individual taps requires extremely complicated and expensive circuitry, therefore limiting the use of such echo cancellers to very expensive receivers.

Since the far-out echos are produced by long time delays between the original signal and the echo, the elimination of the far-out echos requires the use of a transversal filter having a long time delay circuit and a large number of taps, which therefore require the complex control circuitry employed in the prior art systems. However, it has been found that of the two, it is the close-in echos which produce the most undesirable distortion of the television or teletext signals. That is, as long as there is no close-in echos, the television signal will produce a sharp and clear display, and the telext data will be reliable. While the existence of a far-out echo in the video signal will produce a ghost-like image, viewers generally agree that the existence of the ghost does not detract from the image quality as seriously as the close-in echos as long as the individual images are clear. Also, for teletext signals the close-in echos are far more detrimental than far-out echos.

Unlike far-out echos, the close-in echos are produced by short time delays between the original signal and the echo signal and thus require only a short time delay in the transversal filter. The distortion produced by the close-in echos produces changes in both the amplitude and phase of the high frequency portions of the television or teletext signals relative to the low frequency portions of the video signals. Therefore, to cancel close-in echos, the transversal filter must function to equalize the amplitude and phase of the high frequency portions of the television or teletext signal relative to the low frequencies of the television or teletext signals.

It is therefore an object of the present invention to provide an arrangement for cancelling close-in echos which eliminates the complex circuitry heretofore necessary to overcome this problem.

It is a specific object of the present invention to provide distortion reduction circuitry for equalizing the amplitude and phase of the high frequency portions of the television or teletext signals relative to the low frequency portions of the television or teletext signals in order to cancel close-in echos. More specifically, the present invention provides distortion reduction circuitry having a three tap delay line for reducing the amount of distortion in a received television or teletext signal due to close-in echos.

It is a further object of the present invention to provide distortion reduction circuitry for use in a television receiver for reducing distortion in the received television or teletext signal due to close-in echos, by providing a three tap delay line and by controlling two amplitude and polarity adjusting circuits using detection and control circuitry.

It is a further object of the present invention to use an amplitude distortion detection circuit and a phase distortion detection circuit to provide a low cost close-in echo detection circuit.

It is a further object of the present invention to provide amplitude and polarity adjustment control circuitry for controlling the amplitude and polarity of two adjustment circuits in distortion reduction circuitry.

In accordance with the invention, a system is provided for detection distortion in television or teletext signals due to multipath effects. The system includes circuitry for providing a known signal of predetermined phase, circuitry for providing a portion of a received television or teletext signal and circuitry for detecting a component of the portion of the received television or teletext signal which has a predetermined phase relationship with the known signal to provide a signal indicative of the amplitude distortion. Specifically, the circuitry for providing the portion of the received television or teletext signal, includes a gate for receiving and selectively passing a portion of the television or teletext signal having a predetermined amplitude and phase prior to transmission thereof.

In accordance with a first aspect of the invention, amplitude distortion in the television or teletext signal is detected by providing a known signal which is substantially in phase with the predetermined phase. The portion of the received television or teletext signal may be a color subcarrier burst, or other portion of the television or teletext signal having predetermined phase characteristics. The known signal may be a regenerated color subcarrier shifted in phase to substantially negative B−Y phase. The circuitry for detecting may include a synchronous detector.

In accordance with a second aspect of the invention, phase distortion in the television or teletext signal is detected by providing a known signal which is substantially in phase quadrature with the predetermined phase. The circuitry for detecting provides an AC phase quadrature signal indicative of the phase distortion. The portion of the received television or teletext signal may be a color subcarrier burst, or other portion of the television or teletext signal having a predetermined phase. The known signal may be the regenerated color subcarrier shifted in phase to substantially R−Y phase by phase shifting circuitry. The circuitry for detecting may include a synchronous detector. The phase shifting circuitry may include circuitry for extracting a DC signal from the synchronous detector indicative of the component of the gated portion of the television or teletext signal which is in phase with the known signal to provide a phase adjust signal, and a phase shifter to shift the phase of the regenerated color subcarrier in accordance with the phase adjust signal.

In accordance with a preferred embodiment of the invention, the phase and amplitude detection systems described above may be combined in a detection system for detecting both amplitude and phase distortion in television or teletext signals due to multipath effects. The signals indicative of phase and amplitude distortion are applied to apparatus for controlling a transversal filter to reduce the phase and amplitude distortion.

In accordance with a third aspect of the invention, the control apparatus controls a transversal filter having a delay line which receives the television or teletext signal, the transversal filter having first, second and third successive delay line taps providing first, second and third tap signals, respectively. The control apparatus includes circuitry for adjusting the amplitudes of the first and third tap signals equally and for adjusting the polarity of the first and third tap signals oppositely to thereby provide phase equalization of the received signal. The amplitude and polarity of the second tap signal is maintained constant or adjusted by a conventional AGC circuit to maintain a constant level. More specifically, the adjustment circuitry may include a pair of variable gain and polarity amplifiers each receiving an associated one of the first and third tap signals, and a doubly balanced switch having a control input receiving a phase adjustment signal and two input lines each providing a control signal to an associated one of the pair of amplifiers to thereby control the gain and polarity of the first and third tap signals.

The control apparatus may be further modified by providing a second circuit for adjusting the amplitude and polarity of the first and third tap signals equally to thereby provide amplitude equalization of the received signal. The second circuit may include first and second symmetric transistor pairs receiving a common amplitude adjustment signal and operatively coupled to the doubly balanced switch to thereby change the amplitude of the first and second control signals in unison in accordance with the amplitude adjustment signal.

These and other objects of the invention will be discussed with reference to the following drawing figures of which.

For the remainder of the specification, the term "video signal" shall encompass both television signals and teletext signals, the present invention being equally applicable to both.

Figure 1:
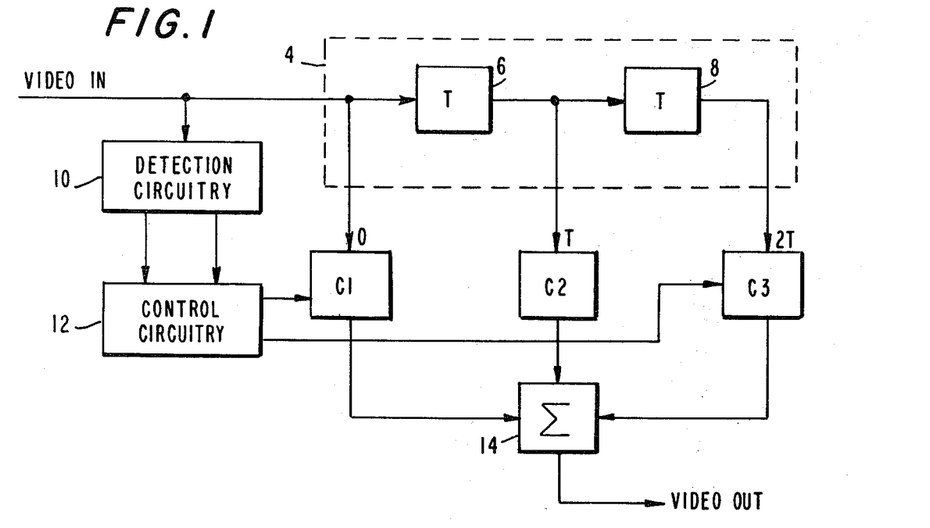
FIG. 1 is a block diagram of the system for reducing phase and amplitude distortions of television or teletext signals produced by close-in echos, including a transversal filter, detection circuitry, and control circuitry.

FIG. 1 shows the distortion reduction circuitry in accordance with the invention. The distortion reduction circuitry is disposed in television or teletext receiver and receives the incoming video signal at delay line 4 which has three taps providing relative delays of zero, T and 2T, as shown. The video signal is also applied to detection circuitry 10. The signal applied to delay line 4 is applied to delay element 6 and to adjustment circuit C1 by way of the zero delay tap. The output of delay element 6 is applied to delay element 8 and adjustment circuit C2 by way of the T delay tap. The output from delay circuiy 8 is applied to adjustment circuit C3 by way of the 2T delay tap. The adjustment circuits C1–C3 comprise amplifiers of well known construction and function to adjust the amplitude and the polarity of the signals input thereto. The gain and polarity of circuits C1 and C3 are controlled by control circuitry 12, which receives a detection output from detection circuitry 10, the gain and polarity of circuit C2 being fixed. The outputs of the adjustment circuits C1–C3 are applied to adder 14, the output of which provides to the remaining portions of the television receiver a video signal which is substantially free from close-in echos.

The nature of the distortion of the video signal due to close-in echos must be first understood in order to appreciate the invention. The distortion produced by close-in echos produces changes in both amplitude and phase of the high frequency portions of the video signals with respect to the low frequency portions of the video signal. More particularly, the higher frequency portions of the signal (frequencies around the color subcarrier of 3.58 MHz) tend to be attenuated relative to the lower frequency portions of the video signal, and further tend to be advanced in phase relative to the lower frequencies. Thus, by increasing the gain of the higher frequencies of the video signal relative to the lower frequencies and by delaying in time the higher frequencies relative to the lower frequencies, the video signal can be equalized to thereby reduce or eliminate close-in echos.

Figure 2:
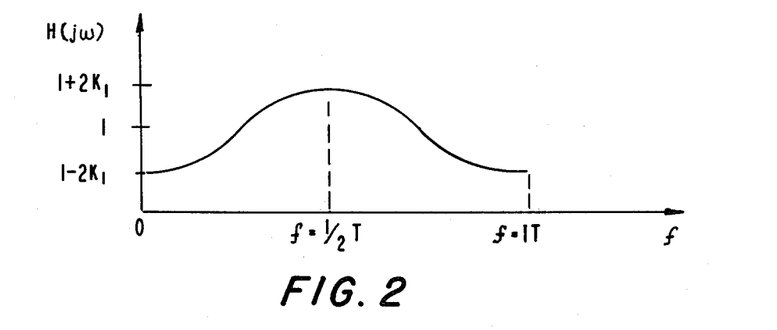
FIG. 2 is a graph illustrating the amplitude versus frequency response of the waveform equalizer of FIG. 1 when operating to reduce amplitude distortion.

This amplitude equalization may be achieved by providing adjustment circuit C2 with a unity gain and positive coefficient (the polarity of the output signal is identical to the polarity of the input signal), and by adjusting the amplification factor of circuits C1 and C3 together equally with a negative coefficient (the polarity of the output signal is opposite the polarity of the input signal), where the gains of circuits C1 and C3 are less than or equal to the gain of circuit C2. Under these conditions, the transfer function of the circuitry of FIG. 1 may be defined as:

$$H(j\omega) = 1 - K_1(e^{j\omega T} + e^{-j\omega T}) = 1 - 2K_1 \cos \omega T, \quad (1)$$

where $-K_1 = C1 = C3$ is the amplification factor of adjustment circuits C1 and C3, and T is the time delay produced by each of delay elements 6 and 8. The magnitude variation of $H(j\omega)$ as a function of frequency is illustrated in FIG. 2. By inspecting Equation 1 and FIG. 2, it can be seen that since there is no imaginary term in $H(j\omega)$, there is no phase shift or phase distortion produced by the distortion reduction circuitry for amplitude equalization. Thus, the distortion reduction circuitry when operated in this manner emphasizes signals having frequencies around $f = \frac{1}{2}T$ without introducing phase distortion or shifting. The amplitude characteristic illustrated in FIG. 2 shows a sinusoidal response that varies between $1 - 2K_1$ and $1 + 2K_1$ in amplitude. When $\omega = 0$, the output is at the minimum, $1 - 2K_1$, and when $\omega = \pi/T$ ($f = \frac{1}{2}T$), the filter provides the maximum amplitude of $1 + 2K_1$. The boost in amplitude of the high frequencies required to equalize the video signal may be produced by adjusting T such that the peak of the curve occurs at or near the high frequency edge of the luminance. In accordance with the present invention, the time delay T is chosen to be approximately 0.14 microseconds ($1/(2 \times 3.58 \text{ MHz})$) based on the color subcarrier frequency of 3.58 MHz.

Operation of the distortion reduction circuitry in the foregoing matter thereby allows an amplitude adjustment of the high frequencies in the signal relative to the lower frequencies to compensate for close-in echos, the compensation producing no phase distortion when the coefficients C1 and C3 are adjusted identically.

Phase adjustments of the high frequency video relative to the low frequencies, on the other hand, require that the amplification of circuits C1 and C3 be adjusted with equal amplitude but opposite polarity. That is, by making $C1 = -C3 = -K_2$, the transversal filter is provided with the transfer function $$H(j\omega t) = 1 - K_2 e^{j\omega T} + K_2 e^{j\omega T} = 1 - j2K_2 \sin \omega T \quad (2)$$

Figure 3:
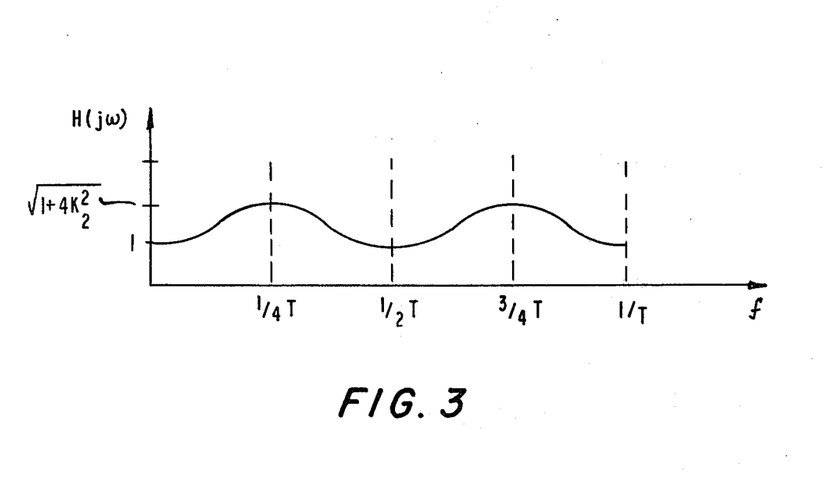
FIG. 3 is a graph illustrating the amplitude versus frequency response of the equalizer of FIG. 1 when operated to reduce phase distortion.

This transfer function provides both an amplitude and phase response as a function of frequency. The amplitude response is illustrated in FIG. 3 and may be specified by $$|H(j\omega)| = \sqrt{1 + 4K_2^2 \sin^2 \omega T} = \sqrt{1 + 2K_2^2 - 2K_2^2 \cos 2\omega T}, \quad (3)$$

while the phase response is specified by $$\phi = \arctan(-2K_2 \sin \omega T) \quad (4)$$

Thus, by adjusting the coefficients C1 and C3 in an opposite sense, the phase response of the transversal filter may be varied in accordance with Equation 4. However, the phase adjustment in accordance with Equation 4 also produces a change in the amplitude characteristics of the distortion reduction circuitry in accordance with Equation 3. Fortunately however, as shown in FIG. 3, the amplitude variation produced in accordance with Equation 3 is considerably less than the magnitude of that produced in accordance with Equation 1.

The time delay of the high frequencies relative to the lower frequencies produced by the phase response of the Equation 4 may be estimated as follows. Working at the color subcarrier frequency of 3.58 MHz = $\frac{1}{2}$ T, the angular frequency $\omega$ is equal to $\pi/T$. Thus, $\sin \omega T = \sin \pi = 0$. Since the circuitry will be operating at or near 3.58 MHz, $\sin \omega T$ will be either 0 or a small value. For a small argument x, $\arctan x$ is approximately x. Since the absolute value of $K_2$ is less than or equal to 1, Equation 4 can be approximated by $$\phi \approx -2K_2 \sin \omega T \quad (5)$$

The time delay $t_d$ is equal to $d\phi/d\omega$. Therefore, $$t_d = d\phi/d\omega = -2K_2 T \cos \omega T \quad (6)$$

Since the circuit will be operated near $\omega T = \pi$, $\cos \omega T$ is approximately $-1$. Thus, $$t_d \approx 2K_2 T \quad (7)$$

This illustrates that the primary effect of the phase adjustment is a simple time delay of the higher frequency portion of the video signal near 3.58 MHz relative to the lower frequencies. The amount of the delay can be adjusted by varing the value K, since 2T is constant.

Figure 4A:
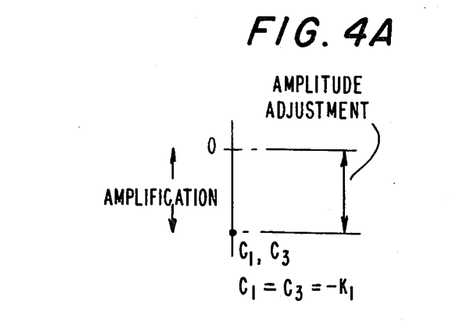
FIGS. 4a–4c are graphic illustrations helpful in understanding the operation of the waveform equalizer of FIG. 1 as an amplitude and phase reduction circuit.
Figure 4B:
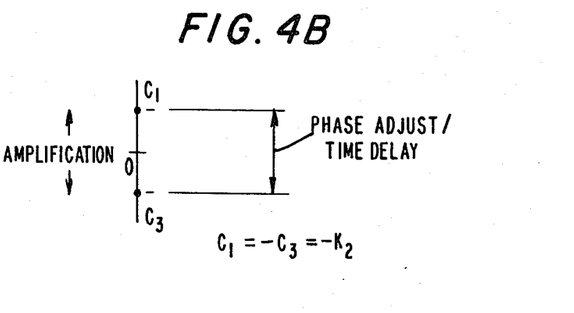
Figure 4C:
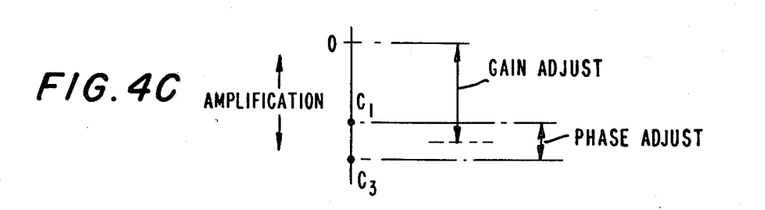

FIG. 4a illustrates the situation where the amplification of circuits C1 and C3 are adjusted equally with negative polarity. Adjusting circuits C1 and C3 in this matter provides amplitude equalization of the signal applied to the distortion reduction circuitry in accordance with Equation 1, the amplitude equalization producing no phase shift or phase distortion. FIG. 4b illustrates the situation where the amplification of circuits C1 and C3 is equal but of opposite polarity, to provide phase equalization in accordance with Equation 4. FIG. 4c illustrates the situation where the distortion reduction circuitry equalizes both the phase and gain of the video signal in accordance with both Equations 1 and 4. The relative amplification of circuits C1 and C3 for the phase adjustment is superposed on the amplification provided for circuits C1 and C3 for the gain adjustment. That is, the phase adjustment is related to the difference in magnitude between coefficients C1 and C3, while the gain adjustment is a function the average of the magnitudes of coefficients C1 and C3 relative to zero. Again, the gain variation due to the phase adjustment in accordance with Equation 3 is not considered at this point since the gain adjustment in accordance with Equation 1 dominates.

Figure 5:
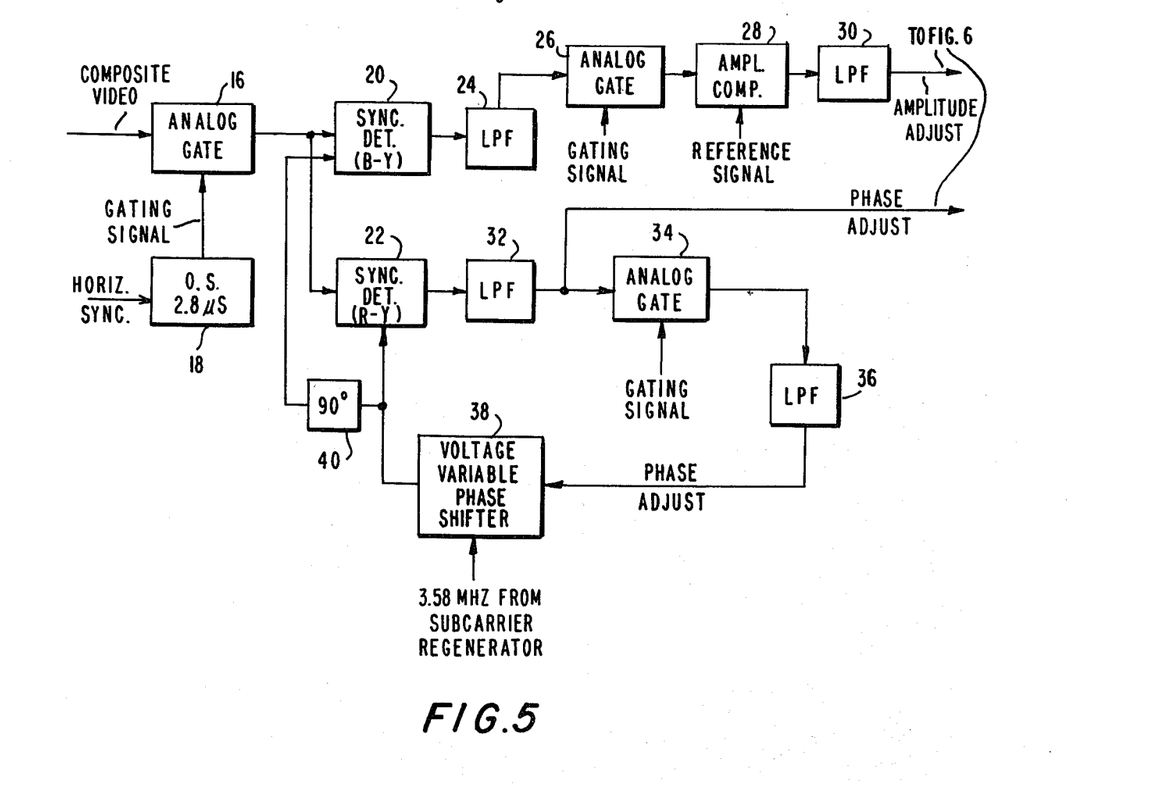
FIG. 5 is a block diagram of the amplitude and phase distortion detection circuitry employed for use in the waveform equalizer in FIG. 1 for correcting amplitude and phase distortion.

Detection circuitry 10 for detecting phase and amplitude distortion in the video waveform is illustrated in FIG. 5. By comparing a portion of the received video signal with a regenerated signal having amplitude and phase characteristics identical to the transmitted video signal, phase and amplitude distortion of the received video signal due to multipath effects can be determined. One such signal having the above-mentioned predetermined phase and amplitude qualities is the color subcarrier burst signal. As is well known, the color subcarrier burst resides directly after the trailing edge of the horizontal sync pulse, and exists for approximately 8 to 11 cycles at the color subcarrier frequency of 3.58 MHz. Thus, to develop the timing signals necessary to gate the color subcarrier burst into the detection circuitry, a color subcarrier burst of 10 cycles will be assumed. However, it will be clear to those skilled in the art that variations in the generation of timing signals to achieve any particular gating scheme can readily be employed.

With reference to FIG. 5, the composite video signal, which includes luminance, chrominance, and synchronization signals, is applied to analog gate 16 which accepts the composite video signal only during the gating signal produced by applying the horizontal synchronization pulse to a monostable multivibrator, or one-shot 18. The one-shot 18 is triggered by the trailing edge of the horizontal synchronization pulse, and produces a 2.8 microsecond gating pulse which is applied to analog gate 16. The 2.8 microsecond duration of the gating signal corresponds to the 10 cycles of the color synchronization burst at 3.58 MHz.

The gated color subcarrier burst is applied to a first input of synchronous detectors 20 and 22. The output of synchronous detector 20 is applied to low pass filter 24, which in turn has an output applied to an optional analog gate 26. The output of gate 26 is applied to an amplitude comparator 28 which in turn provides an output signal to low pass filter 30. Low pass filter 30 provides an amplitude adjust signal to control circuitry 12, FIG. 6. The output of synchronous detector 22 is applied to low pass filter 32, which in turn provides an output signal to analog gate 34 and a phase adjust signal to control circuitry 12, FIG. 6. Gate 34 provides an output signal to low pass filter 36, the latter of which provides an output signal to a first input of voltage variable phase shifter 38, which receives a regenerated color subcarrier from standard television circuitry, at a second input thereof. The output of phase shifter 38 is applied, on the one hand to the second input of synchronous detector 22, and on the other hand to the second input of synchronous detector 20 via 90° phase shifter 40.

The color subcarrier burst provided at the output of analog gate 16 is substantially in negative B−Y phase. That is, it is 180° out of phase from the B−Y (blue minus luminance) signal. The output of the phase shifter 38, on the other hand, will substantially be in phase with the R−Y (red minus luminance) signal, which in turn is in phase quadrature with the negative B−Y phase signal. Therefore, by shifting the output of the phase shifter 38 by 90° in shifter 40, to produce a signal in phase with the negative B−Y signal, detector 20 has two signals of approximately the same phase applied thereto. On the other hand, synchronous detector 22 has two signals presumably in phase quadrature applied thereto, namely the color subcarrier burst and the output of phase shifter 38.

The output of each synchronous detector 20 and 22 is given by $$V(t) = I(t) \cos \theta + Q(t) \sin \theta, \quad (8)$$

where $V(t)$ is the output of the detector, $I(t)$ is the in-phase component, $Q(t)$ is the quadrature component, and $\theta$ is the angle between the two signals applied to each synchronous detector. When $\theta = 0°$, $V(t) = I(t)$, the in-phase component of the signal. When $\theta = 90°$, $V(t) = Q(t)$, the quadrature component of the signal. Assuming that some phase error is experienced in the transmission of the color subcarrier burst due to close-in echos, the angle $\theta$ between the signals applied to each of the detectors will fall between 0° and 90° to thereby produce both in-phase and quadrature components at the outputs of both detectors. The quadrature signal produced by the detectors is an AC signal having no DC component, while the in-phase term has either a positive or negative DC component depending upon the phase relationship of the signals applied to the detector. Thus, by applying the output of synchronous detector 20 to low pass filter 24 having a long time constant relative to the frequency of the AC quadrature component, the quadrature term will effectively be canceled leaving only the in-phase term indicative of the amplitude of the video signal. This DC level may be applied to analog gate 26 which functions to remove harmonics and transients at the beginning and end portions of the gating signal applied to analog gate 16, if so desired. Depending upon the particular application and desired sensitively, analog gate 26 may be omitted. The DC term indicative of the in-phase component is applied to an amplitude comparator 28 which functions to provide an amplitude adjustment signal to the control circuitry 12. Amplitude comparator 28 is of well known design, and functions to provide an output having a voltage level directly corresponding to the voltage level of the input. The reference signal is set so that the comparator produces an output in the middle of the signal level range when the input to the analog gate 26 is of the proper amplitude. If the signal level is too large or too small, the output of comparator 28 will be either higher or lower than the middle of the range, respectively. The output of amplitude comparator 28 is applied to low pass filter 30 which has a long time constant relative to the subcarrier burst timing, such that it provides a substantially constant amplitude signal to the control circuitry between bursts.

As briefly discussed above, the output of analog gate 16 is substantially in negative B−Y phase, while the output of variable phase shifter 38 is in R−Y phase, which is in phase quadrature with the negative B−Y phase. Thus, the major component output from detector 22 will be sinusoidally varying quadrature component. However, if any phase distortion in the video signal has occured, it will manifest itself in a shift from negative B−Y phase. Thus, an in-phase component corresponding to the phase error of the color subcarrier burst signal is also present of the output detector 22. Unlike the quadrature component, this in-phase component has a DC level. The output of detector 22 is applied to low pass filter 32 which has a relatively short time constant and merely functions to eliminate harmonics and switching transients. The sinusoidal varying quadrature term, also indicative of phase distortion, is applied to the control circuitry 12 as the phase adjustment signal. The quadrature term is removed from the signal by applying the composite signal (in-phase and quadrature) to analog gate 34, and by gating the signal for one complete cycle of the sinusoidal term. The sinusoidal quadrature term will integrate out thereby leaving only the in-phase DC term. The ouput of the analog gate is then applied to low pass filter 36 which has a long time constant relative to the repetition frequency of the subcarrier burst. The signal is then delivered to the voltage variable phase shifter 38 which functions to fine tune the phase of the regenerated subcarrier so that it is as close to R−Y phase as possible. Depending upon the type of voltage variable phase shifter 38 employed, low pass filter 36 may not be required. Additionaly, if low pass filter 36 is employed, analog gate 34 may be omitted for some applications, since the AC term will essentially be removed in low pass filter 36.

Figure 6:
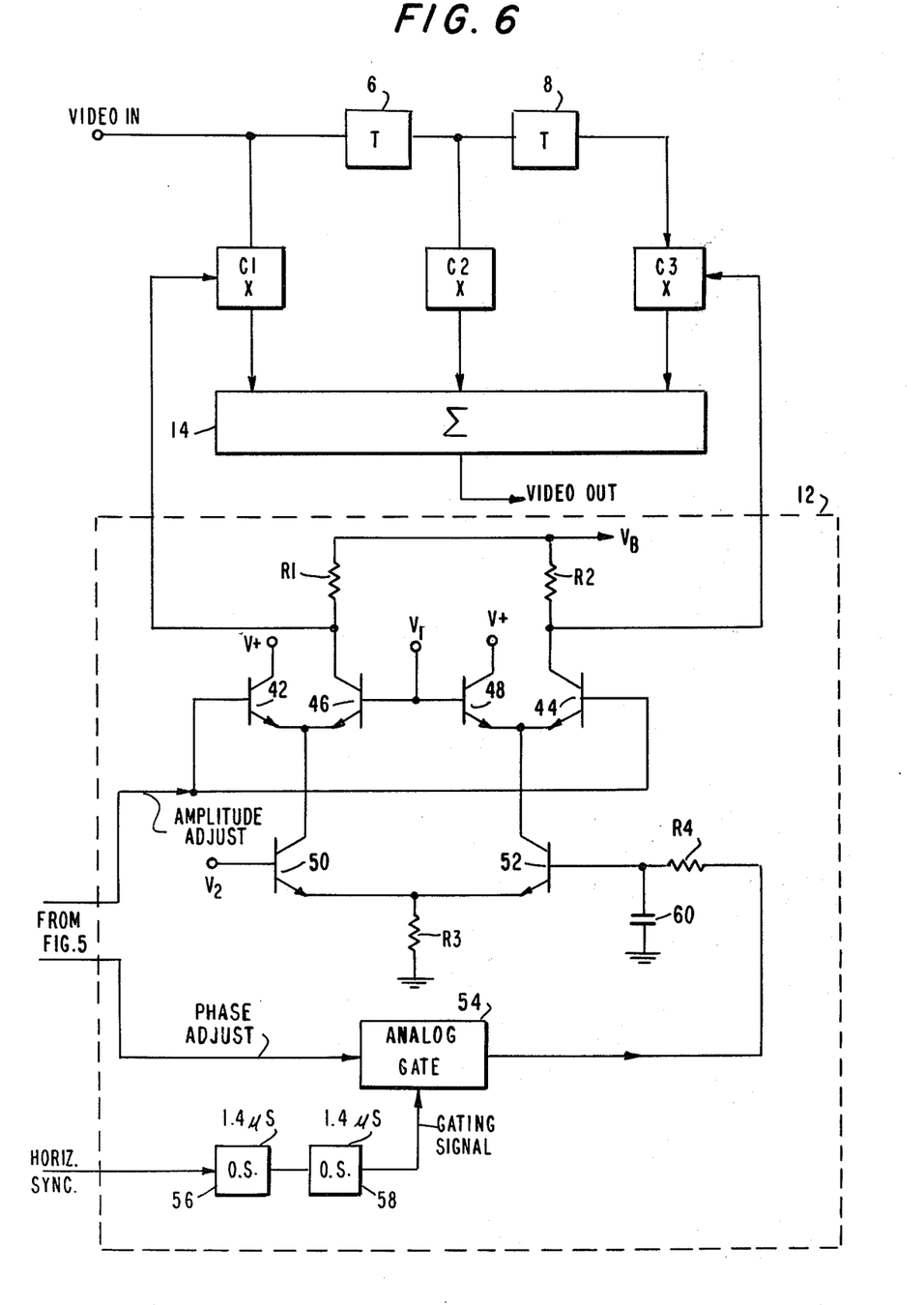
FIG. 6 is a schematic illustration of the control circuitry employed to control the waveform equalizer in accordance with the detected amplitude and phase distortions.

As described above, the output of the low pass filter 32 is a signal indicative of the phase distortion in the composite video signal, and is applied to the phase adjustment circuitry shown in FIG. 6. Since the phase distortion is detected on the basis of how much quadrature distortion is produced in the color burst signal centered about 3.58 MHz, the frequency range over which phase distortion can be corrected depends upon the bandwidth of the burst signal that we choose. By choosing the color synchronization burst, phase distortion over a range of ±400 KHz around 3.58 MHz can be detected. Since the potential exists for correcting only ±500 KHz around 3.58 MHz, the color synchronization burst corrects almost the full potential range. On the other hand, if the chroma reference in the VIR signal is employed to detect the distortion, for example, corrections can only be effected in the range of ±50 KHz around 3.58 MHz. It should be understood, however, that the color subcarrier burst is described herein only as one example of a signal which can provide the requisite amplitude and phase information and the present invention is not limited thereto. Other signals will be apparent to those skilled in the art.

FIG. 6 illustrates one embodiment of control circuitry 12 which may provide the amplitude and phase adjustments to the transversal filter. With reference to FIG. 6, control circuit 12 receives the amplitude adjustment signal from low pass filter 30 at the bases of NPN transistors 42 and 44. Transistor 42 has its emitter directly connected to the emitter of NPN transistor 46, while transistor 44 similarly has its emitter connected to the emitter of NPN transistor 48. The bases of transistors 46 and 48 are directly connected to supply voltage $V_1$, while the collectors of transistors 44 and 46 are connected to supply voltage $V_B$ via resistors R1 and R2. The collectors of transistors 42 and 48 are connected to a positive supply voltage V+. NPN transistor 50 has its collector coupled to the emitters of transistors 42 and 46, and has its base connected to reference voltage V2. NPN transistor 52 has its collector connected to the emitters of transistors 44 and 48. The emitters of transistors 50 and 52 are connected together to ground via resistor R3. The phase adjustment signal from low pass filter 32, FIG. 5, is applied to analog gate 54, which receives a timing signal from timing circuitry comprising a pair of 1.4 microsecond one-shots 56 and 58. The output of analog gate 54 is applied to the base of transistor 52 through resistor R4, the base of transistor 52 being applied to ground via capacitor 60.

The control inputs to adjustment circuits C1 and C3 are taken directly from the collectors of transistors 46 and 44, respectively. It can be seen that the voltages applied to circuits C1 and C3 are proportional to the amount of current flowing through transistors 46/50 and 44/52. Transistors 50 and 52 comprise a doubly balanced switch, such as that when the signal applied to the base of transistor 52 exceeds the reference voltage V2 applied to the base of the transistor 50, transistor 50 will begin to turn off, and transistor 52 will begin to turn on. As a result, the current through transistors 46/50 decreases, the current through transistors 44/52 increases accordingly. On the other hand, as the signal applied to transistor 52 falls below $V_2$ the current through transistors 46/50 increases relative to the current through transistors 44/52. It can be seen that this type of control will produce a phase adjustment with accordance Equation (4), and as illustrated in FIG. 4b. That is, as the control signal to circuit C1 increases, (positive), the control signal to circuit C3 decreases (negative) an equal amount. The phase adjustment signal from low pass filter 32 is applied to analog gate 54 which receives timing signals from one-shot circuits 56 and 58. Since the quadrature signal produced by detector 22 is sinusoidal, it is necessary to gate on the first or second portions of the output signal of the detector, or the signal applied to the base of transistor 52 will integrate to zero over a given period. Since the output of low pass filter 32 is approximately 2.8 microseconds in duration as determined by the gating signal provided by one-shot 18, a pair of one-shots having ½ that period (1.4 microseconds) are provided to produce a gating signal during the second portion of the main gating signal and having a period equal to ½ of the main gating signal. The output of analog gate 54 is integrated in the low pass filter provided by resistor R4 and capacitor 60 to provide the phase adjustment as described above.

The amplitude adjustment signal is applied to the bases of transistors 42 and 44. From the symmetry of the circuit comprising transistors 42–48, it can be seen that the current through transistors 46 and 44 varies in unison with the amplitude adjustment signal, to thereby provide an amplitude adjustment in accordance with Equation (1), and as shown in FIG. 4a. The amplitude and phase adjustment signals applied to the transistors in control circuitry 12 combine to produce amplitude and phase adjustments as illustrated in FIG. 4c. The values of the voltages $V_1$ and $V_2$ along with the requisite biasing on adjustment circuits C1 and C3 to produce the adjustments illustrated in FIGS. 4A–4C will be readily apparent to those skilled in the art.

Various changes to the circuitry and techniques described herein may be made by those skilled in the art, within the scope of the present invention. For example, one-shot circuits 18, 56 and 58 may be modified by use in conjunction with additional timing circuits to provide highly precise timing in a well known manner, if so desired. Further, while the color subcarrier burst has been used in the above discussions, it is evident that other such signals may be employed in order to determine the amplitude and phase characteristics of the received video signal.

While the preferred embodiments have been shown and described in the foregoing specification and drawings, the scope of the invention shall be defined with reference to the following claims.

What I claim is:

1. In a transversal filter having a delay line which receives a signal, said delay line having first, second and third successive delay line taps providing first, second and third tap signals, respectively; a control apparatus comprising:
   first means (i) for adjusting the amplitudes of said first and third tap signals equally and (ii) for adjusting the polarity of said first and third tap signals oppositely to thereby provide phase equalization of said received signal; and
   second means for adjusting the amplitudes and polarities of said first and said third tap signals equally to thereby provide amplitude equalization of said received signal.

2. The control apparatus of claim 1 wherein the amplitude and polarity of said first and third tap signals are adjusted in first and second variable gain and polarity amplifiers, respectively; said first means comprises a doubly balanced switch having a control input receiving a phase adjustment signal and two output lines providing first and second control signals to said first and second amplifiers respectively, to thereby control the gain and polarity of said first and third tap signals; and said second means comprises first and second symmetric transistor pairs receiving a common amplitude adjustment signal and operatively coupled to said doubly balanced switch, to thereby change the amplitude of said first and second control signals in unison in accordance with said amplitude adjustment signal.

3. In a transversal filter having a delay line which receives a signal, said delay line having first, second and third successive delay line taps providing first, second and third tap signals respectively; a control apparatus comprising:
   means (i) for adjusting the amplitude of said first and third tap signals equally and (ii) for adjusting the polarity of said first and third tap signals oppositely to thereby provide phase equalization of said received signal, said means for adjusting including a pair of variable gain and polarity amplifiers each receiving an associated one of said first and third tap signals, and a doubly balanced switch having a control input receiving a phase adjustment signal and two output lines each providing a control signal to control the gain and polarity of said first and third tap signals.

4. The control apparatus of any one of claims 1, 2 and 3 wherein said second tap signal is applied to a fixed amplitude and polarity amplifier.

5. A system for detecting and reducing phase distortion in video signals due to multipath effects, comprising means for providing a known signal of predetermined phase, means for providing a portion of a received video signal, means for detecting a component of said portion of said received video signal which is in phase quadrature with said known signal to provide a correction signal indicative of said phase distortion, and transversal filter means receiving said correction signal and said video signal for reducing the phase distortion in said video signal in accordance with said correction signal to produce video signal in which the phase distortion is reduced.

6. A system for detecting and reducing amplitude and phase distortions in video signals due to multipath effects, comprising means for providing a known signal of predetermined phase, means for providing a portion of a received video signal, first detector means for detecting a component of said portion of said received video signal which is in phase with the known signal to provide a first correction signal indicative of said amplitude distortion, second detector means for detecting a component of said portion of said received video signal which is in phase quadrature with said known signal to provide a second correction signal indicative of said phase distortion, and transversal filter means receiving said first and second correction signals and said video signals for reducing the amplitude and phase distortions in said video signals in accordance with said correction signals to produce video signals in which the amplitude and phase distortions are reduced.

7. A system for detecting and reducing phase distortion in video signals due to multipath effects, comprising:
   gating means for receiving and selectively passing a portion of one of said video signals having a predetermined amplitude and phase prior to transmission thereof, said gating means providing a gated signal;
   means for providing a means signal which is substantially in phase quadrature with said gated signal;
   detector means coupled to receive said gated signal and said known signal for detecting a component of said gated signal which is in phase quadrature with said known signal to provide a correction signal indicative of said phase distortion; and
   transversal filter means coupled to receive said correction signal and said video signals for reducing the phase distortion in said video signals in accordance with said correction signal to produce video signals in which the phase distortion is reduced.

8. A system for detecting and reducing amplitude and phase distortions in video signals due to multipath effects, comprising:
   gating means for receiving and selectively passing a portion of one of said video signals having a predetermined amplitude and phase prior to transmission thereof, said gating means providing a gated signal;
   means for providing a first known signal which is substantially in phase with said gated signals;
   first detector means receiving said gated signal and said first known signal for detecting a component of said gated signal which is in phase with said known signal to provide a first correction signal indicative of said amplitude distortion;
   means for providing a second known signal which is substantially in phase quadrature with said gated signals;
   second detector means receiving said gated signal and said second known signal for detecting a component of said gated signal which is in phase quadrature with said second known signal to provide a second correction signal indicative of said phase distortion;
   transversal filter means coupled to receive said first and second correction signals and said video signals for reducing the amplitude and phase distortions in said video signals in accordance with said correction signals to produce video signals in which the amplitude and phase distortions are reduced.

9. A system for detecting and reducing phase distortion in video signals due to multipath effects, comprising means for providing a regenerated color subcarrier signal of predetermined phase including a phase shifting means by which said regenerated color subcarrier signal is shifted in phase to substantially the R−Y phase, means for providing a color subcarrier portion of a received signal, synchronous detector means for detecting a component of said color subcarrier portion of said received video signal which is in phase quadrature with said regenerated color subcarrier signal to provide a correction signal indicative of said phase distortion, and transversal filter means receiving said correction signal and said video signal for reducing the phase distortion in said video signal in accordance with said correction signal to produce video signal in which the phase distortion is reduced.

10. The system of claim 9, wherein said phase shifting means includes means for extracting a D.C. signal from said synchronous detector indicative of a component of said received video signal which is in phase with said known signal to provide a phase adjust signal, and phase shifter means for shifting the phase of said regenerated color subcarrier in accordance with said phase adjust signal.

* * * * *